United States Patent [19]

Miura et al.

[11] Patent Number: 4,617,055
[45] Date of Patent: Oct. 14, 1986

[54] METAL CORED CERAMIC SURFACED FINE POWDER MATERIAL AND APPARATUS AND METHOD FOR MAKING IT

[75] Inventors: Hirohisa Miura; Hiroshi Satou; Toshio Natsume; Hidenori Katagiri, all of Toyota, Japan

[73] Assignee: Toyota Jidosha Kabushiki Kaisha, Toyota, Japan

[21] Appl. No.: 677,469

[22] Filed: Dec. 3, 1984

Related U.S. Application Data

[62] Division of Ser. No. 481,464, Apr. 1, 1983.

[30] Foreign Application Priority Data

Apr. 2, 1982 [JP] Japan ................................ 57-054873

[51] Int. Cl.$^4$ .............................................. B22F 9/00
[52] U.S. Cl. ...................................... 75/251; 75/0.5 B; 75/0.5 BC; 75/252
[58] Field of Search ................... 75/252, 251, 0.5 BC, 75/0.5 B; 428/404; 118/726

[56] References Cited

U.S. PATENT DOCUMENTS

| | | | |
|---|---|---|---|
| 3,846,084 | 11/1974 | Pelton | 75/0.5 BC |
| 4,072,771 | 2/1978 | Grier | 428/404 |
| 4,174,211 | 11/1979 | Ohmura et al. | 75/0.5 BC |
| 4,484,943 | 11/1984 | Miura et al. | 75/0.5 BC |

Primary Examiner—Wayland Stallard
Attorney, Agent, or Firm—Oblon, Fisher, Spivak, McClelland & Maier

[57] ABSTRACT

A ceramic surface-metallic core particle composite fine powder material is disclosed, composed of fine particles each having a metallic core and a ceramic surface layer, in which the average value of the ratio of the thickness of the surface layer of a powder particle to the radius of the particle is subtantially greater than 0.05. A method and an apparatus for making this material from core metal and a gas which combines with the core metal to form the ceramic outer layer are also described, in which a gaseous mixture of vapor of the core metal and the gas is passed through a convergent-divergent nozzle and is thereby rapidly cooled by adiabatic expansion so that the core metal as it solidifies forms metal cores for fine particles while the gas reacts with the outer layers of these particles to form ceramic surface layers.

10 Claims, 3 Drawing Figures

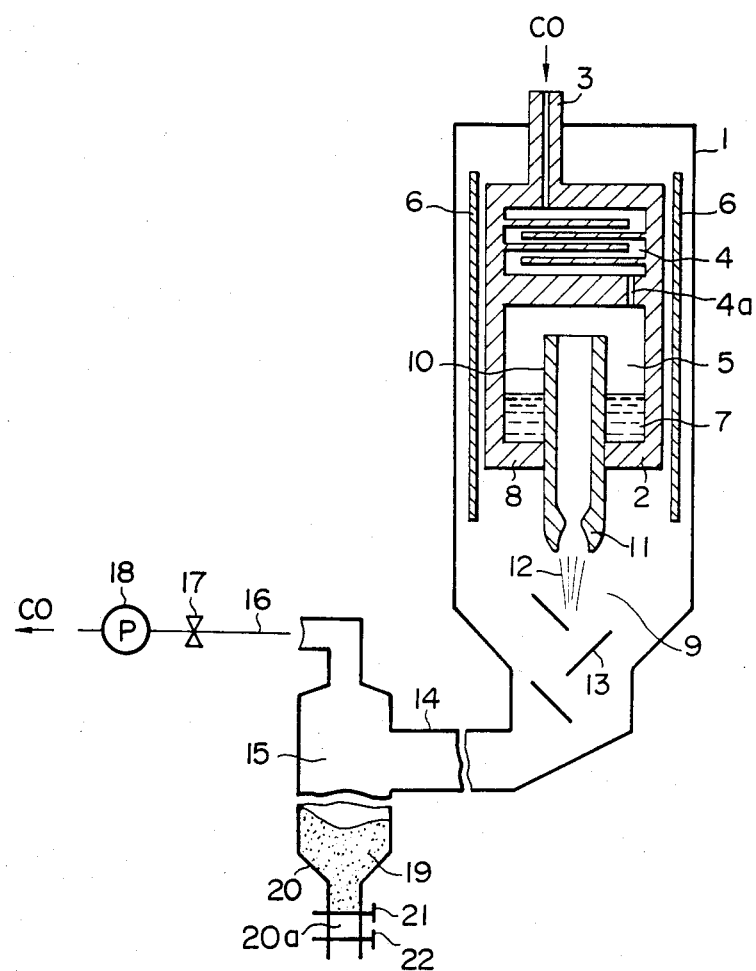
F I G. 1

(x200·000)

METAL CORED CERAMIC SURFACED FINE POWDER MATERIAL AND APPARATUS AND METHOD FOR MAKING IT

This is a division of application Ser. No. 481,464, filed Apr. 1, 1983.

BACKGROUND OF THE INVENTION

1. Field of the Invention

The present invention relates to a type of composite fine powder whose particles have metallic cores and ceramic surface layers, to a method for making it, and to an apparatus for making such fine powder, for practicing the method. In particular, the present invention relates to such a composite fine powder and to a method and an apparatus for making it, which is particularly suitable for utilization as reinforcement material for matrix metal in a particle dispersion type composite material or for use in making a sintered material, and in which a mixture of core metal in vapor form and a gas are rapidly cooled while also being combined together to form the ceramic layers of the particles by rapid expansion through a convergent-divergent nozzle.

2. Description of the Prior Art

Generally, ceramic type metallic compounds such as alumina, silicon nitride, tungsten carbide, and so on are far superior in heat resistance and wear resistance to metals in general; and accordingly it has often been attempted to construct various structural members of various apparatuses out of composite material in which particles of powder of such ceramics are disposed in a matrix of metal, or alternatively of sintered material in which particles of powder of such ceramics are sintered together.

However, because powder particles consisting solely of such ceramics are very brittle, because the even dispersion of such ceramic powder particles in the body of the matrix metal is difficult, and because it is not always possible to ensure good contact between such ceramic powder particles and the matrix metal, such composite or sintered materials are not utilized on a wide scale at the present time, although they are used for some tool materials such as cermets.

Now, a solution to this which might be considered might be to form the reinforcing powder particles with metallic cores and ceramic surface layers, and this might overcome the problem of brittleness outlined above, but in practice in the past this has been very difficult. Performing surface treatment on metallic powder particles in order to provide them with ceramic outer layers has not been practicable for the production in any large volume of powder particles with average diameter of no more than a few microns. Now, of course, in the natural state powder particles of metals which have a strong tendency to become oxidized are covered with a layer of oxide on their surfaces, which is actually a ceramic, but since the typical thickness of such an oxide layer is only twenty angstroms or so in the case of aluminum for instance, or ten atomic layers at most, and since such a very thin oxide layer can be easily destroyed when force is applied to the powder particle, therefore the hardness of such particles and of the powder thereof as a whole is low, and such powder is quite insufficient in its properties as material for forming a powder reinforced type composite material or a sintered material.

SUMMARY OF THE INVENTION

The present invention provides a composite powder whose particles have metallic cores and ceramic outer layers, which can avoid the above mentioned disadvantages.

The present invention provides a composite powder whose particles have metallic cores and ceramic outer layers, and composite material in which it is dispersed in matrix metal.

The present invention also provides a composite powder whose particles have metallic cores and ceramic outer layers, and which is particularly suitable for use as material for a sintered material.

The present invention to provides a composite powder whose particles have metallic cores and ceramic outer layers, and further have good heat resistance.

The present invention further provides a composite powder whose particles have metallic cores and ceramic outer layers, and further have good wear resistance.

The present invention provides a composite powder whose particles have metallic cores and ceramic outer layers, and further have good toughness.

The present invention also provides a composite powder whose particles have metallic cores and ceramic outer layers, and further have good hardness.

The present invention provides a composite powder whose particles have metallic cores and ceramic outer layers, and further are not brittle.

The present invention also provides a composite powder whose particles have metallic cores and ceramic outer layers, and in which the crystalline configuration of said metallic cores is amorphous.

The present invention provides a composite powder whose particles have metallic cores and ceramic outer layers, with the ceramic outer layers being substantially thick.

The present invention also provides a composite powder whose particles have metallic cores and ceramic outer layers, with the ceramic outer layers being much thicker than the above described naturally occurring very thin oxide layers on metallic particles.

The present invention provides a composite powder whose particles have metallic cores and ceramic outer layers, and further are very small.

The present invention provides as well a composite powder whose particles have metallic cores and ceramic outer layers, and further are no larger than a few microns.

The present invention provides a composite powder whose particles have metallic cores and ceramic outer layers, which can be produced in an efficient fashion.

Yet further, the present invention provides a composite powder whose particles have metallic cores and ceramic outer layers, which can be produced in an economical fashion.

The present invention provides a composite powder whose particles have metallic cores and ceramic outer layers, which can be produced in a fashion suitable for mass production.

The present invention also provides a composite powder whose particles have metallic cores and ceramic outer layers, which can be produced by a continuous process which is suitable for being continuously practiced.

Furthermore, the present invention provides a composite powder whose particles have metallic cores and ceramic outer layers, whose particles in particular have cores composed of magnesium metal and outer layers composed of magnesium oxide.

The present invention provides a composite powder whose particles have metallic cores and ceramic outer layers, whose particles in particular have cores composed of metallic silicon and outer layers composed of silicon carbide.

Moreover, the present invention provides methods for making composite powders whose particles have metallic cores and ceramic outer layers, said powders being of the types whose provision has been detailed above.

Further, the present invention provides a series of apparatus for making composite powders whose particles have metallic cores and ceramic outer layers, which can practice such methods whose practice has been detailed above.

DESCRIPTION OF THE INVENTION

According to the most general aspect of the present invention, it is herein provided a ceramic-metallic composite fine powder material, composed of fine powder particles each having a metallic core and a ceramic surface layer, the average value of the ratio of the thickness of the surface layer of a powder particle to the radius of the particle being substantially greater than 0.05.

Since the particles of this ceramic-metallic fine powder material are very fine, and since each of these particles has a substantially thick surface layer around its metallic core, it is sufficiently hard and at the same time sufficiently tough as a reinforcement material for a composite material. That is, the surfaces of the fine powder particles are ceramic and are therefore sufficiently hard and resistant to heat, which means that when the fine powder material is used as reinforcement material in a powder reinforced type composite material the fine powder particles obstruct the movement of dislocations in the matrix material (typically metal) and also reduce the occurrence of wear in the matrix material. Thus the tensile strength, the wear resistance, and other mechanical properties of the composite material are improved, as well as its heat resistance. Further, the cores of the fine powder particles are ceramic, and therefore are fairly soft as compared with their outside layers, and thus the toughness of the fine powder particle body as a whole is appropriate, so that when this fine powder is used as reinforcement material in a powder reinforced type composite material or as raw material for a sintered material the toughness, impact resistance, and other properties of the composite material or the sintered material are greatly improved as compared with the case in which a mass of fine powder particles consisting only of ceramic is used.

Further, according to a particular aspect of the present invention, this invention provides a ceramic-metallic composite fine powder material as described above, wherein the average value of the ratio of the thickness of the surface layer of a powder particle to the radius of the particle is substantially greater than 0.1.

According to such a product, since the surface layer is quite thick as compared with the overall radius of the powder particles, i.e. as compared with the thickness of the cores of the powder particles, the above mentioned advantages in strength, toughness, heat resistance, and so on of the powder particles and of composite material made therefrom can be best realized.

Further, according to a particular aspect of the present invention, this invention provides a ceramic-metallic composite fine powder material as described above, wherein the average diameter of the particles is substantially less than 5 microns; and further these and other objects are even more particular accomplished by such a ceramic-metallic composite fine powder material, wherein the average diameter of the particles is substantially less than 1 micron.

The present product, affords the the following advantages. In a particle dispersion type composite material, the finer are the reinforcing particles (and also the higher the relative density thereof) the stronger is the resultant product, especially at high temperatures. Further, in the case of a sintered material the finer the particles of the raw material, the stronger is the resultant sintered material. Therefore, according to this particularly specialized feature, the product according to the present invention is substantially improved in terms of increased effectiveness in terms of the strength of a composite material or in serving as raw material for a sintered material. The ceramic-metallic composite fine powder material according to the present invention is far superior for for use as a reinforcing composite material or as raw material for a sintered material to a ceramic-metallic composite fine powder material which has a relatively large particle diameter and which is made by coating a ceramic material over particles of core metal, which can theoretically be made.

As a particular product according to the present invention, the cores of the particles of the ceramic-metallic composite fine powder material according to this invention may be made of magnesium, while the ceramic outer layers of the particles are made of magnesium oxide. Alternatively, the cores of the particles of the ceramic-metallic composite fine powder material according to this invention may be made of metallic silicon, while the ceramic outer layers of the particles are made of silicon carbide.

Now, according to another aspect of the present invention, a method is herein provided of making a ceramic-metallic composite fine powder material composed of fine powder particles each having a metallic core and a ceramic surface layer which is a compound of the metal composing said core and another element. The average value of the ratio of the thickness of the surface layer of a powder particle to the radius of the particle being substantially greater than 0.05, wherein said metal in a gaseous form is mixed with said another element in the gaseous state, the resulting mixture being then passed through a convergent-divergent nozzle and being thereby rapidly cooled by adiabatic expansion.

According to such a method, as the gaseous mixture of the metal and the other element is rapidly so cooled by adiabatic expansion as it passes through the convergent-divergent nozzle, particles condense out of the metal and the other element reacts with the outsides of the particles to form a ceramic outer layer. Since the method can be performed in a continuous fashion, it provides ceramic-metallic composite fine powder economically and practically in a way which is suitable for mass production, and no post-pulverization is required. Further, by suitably adjusting the parameters of the process such as the temperature and the pressure of the mixture before and after the adiabatic expansion through the convergent-divergent nozzle, it is possible to obtain ceramic-metallic composite fine powder particles which have various different size and configuration characteristics, and whose cores are amorphous.

Further, according to another aspect of the present invention, it is herein provided a method of making a ceramic-metallic composite fine powder material composed of fine powder particles each having a metallic core and a ceramic surface layer which is a compound of the metal composing said core and another element. The average value of the raio of the thickness of the surface layer of a powder particle to the radius of the particle being substantially greater than 0.05, wherein said metal in a gaseous form is passed through a first covergent-divergent nozzle and is thereby rapidly cooled by adiabatic expansion, and is then mixed with said another element in the gaseous state, the resulting mixture being then passed through a second convergent-divergent nozzle and being thereby rapidly cooled by adiabatic expansion.

According to such a method, which may be practiced as an alternative to the method specified above in the event that the particular parameters of the specific metal and the specific other element which are to be used so demand, as will be explained later in this specification, as the vapor of the metal is rapidly cooled as it passes through said first convergent-divergent nozzle, it forms a mist of very fine metal particles, possibly also including some metallic vapor. Then, as the still effectively gaseous mixture of the metal and the other element is again rapidly cooled by adiabatic expansion as it passes through said second convergent-divergent nozzle, again the outsides of the metal particles and the other element react together, so as to produce a ceramic compound outer layer on the metal particles which serve as particle cores. Since the method can be performed in a continuous fashion, it again provides ceramic-metallic composite fine powder economically and practically in a way which is suitable for mass production, and no post-pulverization is required. Further, by suitably adjusting the parameters of the process such as the temperature and the pressure of the mixture before and after the adiabatic expansion through the convergent-divergent nozzle, again it is possible to obtain ceramic-metallic composite fine powder particles which have various different size and configuration characteristics, and whose cores are amorphous.

Now, according to various particular applications of the methods of the present invention, the metal and the other element which are reacted or alloyed together may be any suitable combination of a metal and an element which react together suitably. In particular the metal may be magnesium while the other element is oxygen, or the metal may be metallic silicon while the other element is carbon. Further, the other element may be supplied not only as a gas of itself alone but as one component of a compound gas; for example, in the case that the other element is carbon, it may be supplied in the form of carbon monoxide.

Further, according to another aspect of the present invention, it is herein provided an apparatus are accomplished by an apparatus for making a ceramic-metallic composite fine powder material, comprising: a reaction chamber which can contain a source of metal vapor; a means for heating said reaction chamber; a means for introducing gas into said reaction chamber; a condensation chamber; and a convergent-divergent nozzle leading from said reaction chamber to said condensation chamber.

According to such an apparatus, the method first described above may be conveniently performed by charging the metal into the reaction chamber, heating it up by said heating means, supplying said other element in a gas into said reaction chamber, and venting the resultant mixture of metal vapor and said other element into said condensation chamber via said convergent-divergent nozzle, the resulting ceramic-metallic compound fine powder settling out in said condensation chamber to be collected. As the gaseous mixture of the metal and the other element is rapidly so cooled by adiabatic expansion as it passes through the convergent-divergent nozzle, particles of the metal condense out of the vapor, while the other element reacts with the outsides of these particles to form the ceramic outer layer thereof.

Further, according to another aspect of the present it is also herein provided an apparatus for making a ceramic-metallic composite fine powder material, comprising: a first reaction chamber which can contain a source of metal vapor; a first means for heating said first reaction chamber; a second reaction chamber; a means for introducing gas into said second reaction chamber; a condensation chamber; a first convergent-divergent nozzle leading from said first reaction chamber to said second reaction chamber; and a second convergent-divergent nozzle leading from said second reaction chamber to said condensation chamber.

According to such an alternative apparatus, the method secondly described above may be conveniently performed by charging the metal into the first reaction chamber, heating it up by said heating means, and venting the resultant metal vapor through said first convergent-divergent nozzle into said second reaction chamber. As the vapor of the metal is rapidly cooled as it passes through said first convergent-divergent nozzle, it forms a mist of very fine metal particles, possibly also including some metallic vapor. Then said other element which is a gas is supplied into said second reaction chamber, and the resultant mixture of metal mist (and possibly vapor) and said other element in said second reaction chamber is vented into said condensation chamber via said second convergent-divergent nozzle. As the gaseous mixture of the metal mist and the other element is rapidly so cooled by adiabatic expansion as it passes through the second convergent-divergent nozzle, the outer surfaces of the metal particles and the other element react together to form ceramic outer layers on the particles, and the resulting ceramic-metallic composite fine powder settles out in said condensation chamber to be collected.

BRIEF DESCRIPTION OF THE DRAWINGS

The present invention will now be shown and described with reference to several preferred embodiments of the product, of the method, and of the apparatus thereof, and with reference to the illustrative drawings. It should be clearly understood, however, that the description of the preferred embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

FIG. 1 is a schematic structural diagram, showing the first preferred embodiment of the apparatus according to the present invention for making a composite powder according to the present invention whose particles have metallic cores and ceramic outer layers, which practices the first preferred embodiment of the method according to the present invention;

DESCRIPTION OF THE PREFERRED EMBODIMENTS

Figure 2:
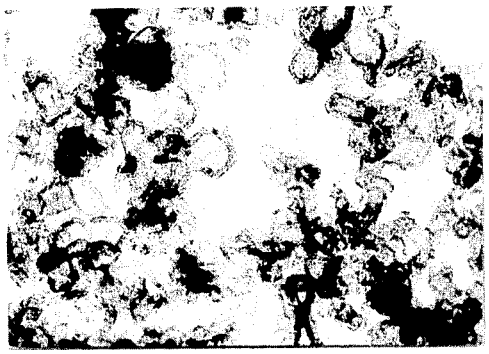
FIG. 2 is an electron photomicrograph at an enlargement of 200,000×, showing a sample of a composite powder which is said first preferred embodiment of the product aspect of the present invention, whose particles have magnesium cores and magnesium oxide surface layers.

The present invention will now be described with reference to two preferred embodiments each of the product, the method, and the apparatus thereof, and with reference to the appended drawings. However, first a general discussion of the particular operational problems inherent in the production of such composite powder particles will be given, along with an outline of the general solutions discovered by the present inventors.

In a prior art concept developed by the present inventors and others, for which previous concept U.S. patent application Ser. No. 471,003 filed Mar. 1, 1983 now U.S. Pat. No. 4,484,943, there was disclosed a method of making fine powder of a compound of a metal and another element by rapidly cooling a gaseous mixture of the metal and the element and causing them to react with one another while being very rapidly cooled by being passed through a convergent-divergent nozzle. Further, in the abovementioned patent application ways were proposed of substantially improving the purity of the metallic compound fine powder by using various special forms of convergent-divergent nozzles. Now, the present invention basically uses a somewhat similarly constructed apparatus for producing quite a different product, by operating the convergent-divergent nozzle in particular temperature and pressure conditions so as to cause metallic particles to be condensed out of the metallic vapor in the mixture gas while at the same time another element in the mixture gas reacts with the surface layers of these condensing particles to form a ceramic compound.

As has been explained above, either the composite fine powder according to the present invention can be produced by passing a mixture of vapor of the core metal and a gas for combining with it through just one convergent-divergent nozzle, so that while the mixture gas is being thus rapidly cooled by adiabatic expansion and while metallic particles are condensing out of it the outer surface layers of these particles are being reacted with an element included in the gas to form a ceramic layer, or alternatively the composite fine powder according to the present invention can be produced by first passing only vapor of the core metal through a first convergent-divergent nozzle, so as to condense at least the cores of metallic particles out of it, and then mixing with the resultant powder particle-vapor mixture a gas for combining with it and possibly reheating the mixture and then passing said mixture through a second convergent-divergent nozzle, so that while this mixture is being thus rapidly cooled by adiabatic expansion and while metallic particles are continuing to condense out of it the outer surface layers of these particles are being reacted with an element included in the gas to form a ceramic layer. In particular, since the particles of the fine powder made in this way have a high degree of surface reactivity, the particles have a strong affinity with matrix metal for embedding them into, and can make a good contact with such matrix metal, and therefore they can be well and evenly dispersed in such matrix metal and adhere well thereto. Further, by making the fine powder particles in this way, it is possible to ensure that the metal making up the cores of the powder particles is in the amorphous crystalline state.

Now, the way in which rapidly cooling a gaseous mixture of a metal vapor and a gas containing at least another element is effective for obtaining extremely fine composite powder according to the present invention will be explained in what follows with regard to, in particular, the production of silicon carbide fine composite powder from a mixture of metallic silicon gas and carbon monoxide gas by rapidly cooling it.

Because in the method of the present invention the metallic silicon is rapidly converted from the vaporized state to the solid state by rapidly cooling the silicon vapor, the method according to this invention can practically and economically produce extremely fine composite powder according to the present invention which has an extremely fine particle diameter and also has substantially uniform particle diameter.

Now, the optimum temperature and pressure conditions for the gaseous mixture before and after the rapid cooling, i.e. before and after the adiabatic expansion through the convergent-divergent nozzle, will be discussed, with reference to the production of silicon carbide fine composite powder.

The temperature and pressure conditions at which silicon and carbon monoxide react together or not and at which the resultant silicon carbide either breaks up or stays in the reacted state are determined by the second law of thermodynamics. In other words, the chemical reaction between metallic silicon vapor and carbon monoxide gas can be expressed in the following formula (1):

$$(Si) + 2(CO) = <Si\ C> + (CO_2) \qquad (1)$$

The change of free energy dF in this formula may be expressed by the following formula (2):

$$dF = dF_0 + RT \ln((P_{CO_2})/(P_{Si} \cdot P_{CO}^2)) \qquad (2)$$

wherein:
  $dF_0$ is the reference free energy change;
  R is the gas constant;
  T is the temperature in degrees Kelvin;
  $P_{Si}$ is the partial vapor pressure of metallic silicon;
  $P_{CO}$ is the partial pressure of carbon monoxide gas; and
  $P_{CO_2}$ is the partial pressure of carbon dioxide gas.

This reduces the following formula (3):

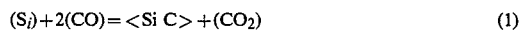

$$dF = 163{,}518 + 5.32T \log T - 109.12T \qquad (3)$$

In this formula (3), silicon carbide is stable as a solid and carbon dioxide as a gas when dF is negative, while metallic silicon vapor as a gas and carbon monoxide as a gas are stable when dF is positive. And the chemical reaction becomes faster with increase in temperature and slower with decrease in temperature, and a certain temperature and pressure condition exists below which substantially no chemical reaction takes place even when dF is negative.

Therefore, in the method of making fine composite powder according to the present invention, it will be clear that by properly selecting the temperature and pressure conditions before the gaseous mixture enters the convergent-divergent nozzle and after the gaseous mixture leaves the convergent-divergent nozzle, and by properly selecting the shape and the dimensions of the divergent nozzle and its operating conditions, it is possible to produce fine composite powder with particles which have metallic cores and ceramic surface layers, by appropriately controlling the time during which the mixture gas is kept under temperature and pressure conditions which allow the ceramic forming chemical reaction to take place between the outside surfaces of condensed metal particles and said other element present in the mixture gas, and by controlling the timing of cooling down the mixture gas to a temperature and pressure range in which said ceramic forming chemical reaction no longer takes place, after first keeping the mixture gas for an appropriate time in such temperature and pressure conditions as will promote the formation of small metallic particles therein by condensation from the metallic vapor without substantial occurrence of the ceramic forming reaction at that time. Further, if the temperature and pressure of the region in which the metallic vapor and the other element are stable without combining together is located in a temperature and pressure range which is difficult to obtain on an industrial basis, for instance in the region of 3000° C., then a method for obtaining composite fine powder at a relatively low temperature in the same way as in the case in which said region in which the metallic vapor and the other element are stable without combining together is located in a temperature and pressure range which is reasonably easy to obtain industrially can be: to connect in series two units each comprising a reaction chamber and a convergent-divergent nozzle, to produce metallic vapor at a temperature which is practically achievable on an industrial basis in the first reaction chamber, to vent this metallic vapor to the second reaction chamber via a first convergent-divergent nozzle while rapidly cooling it so as to form metallic powder as a fine mist which is mixed with metallic vapor remnants, to mix this fine mist metallic powder and gaseous remnants in the second chamber with the gas containing the other element, and then to vent this mixture through a second convergent-divergent nozzle while again rapidly cooling it as the metallic mist particles and the other element are reacting together. In this case, the mixture may be reheated before passing through the second convergent-divergent nozzle, and since the complete evaporation of the condensed metallic particles does not occur immediately their inner parts still remain as cores for being surrounded with ceramic compound as they pass down through said second convergent-divergent nozzle.

In other words, in the first above described case utilizing just one convergent-divergent nozzle, the cores of the powder particles are first produced by cooling the mixture gas in the convergent-divergent nozzle with a priority being given to the production of metallic particles, and then the ceramic outer layers are formed on the metallic powder particle cores by further cooling the mixture gas with a priority being given to the formation of ceramic compound. This can be done by setting the partial pressure of the metallic vapor in the mixture gas before it passes through the convergent-divergent nozzle at a slightly higher level than that at which fine particles which are 100% composed of ceramic compound are produced.

Further, by properly selecting the temperature and pressure conditions before the gaseous mixture enters the convergent-divergent nozzle and after the gaseous mixture leaves the convergent-divergent nozzle, and by properly selecting the shape and the dimensions of the divergent nozzle and its operating conditions, it is possible to produce fine composite powder with particles which have any particular desired average diameters, average ratios of thickness of surface ceramic layer to diameter, and other parameters.

THE CONSTRUCTION OF THE FIRST APPARATUS EMBODIMENT

In FIG. 1 there is shown a schematic structural view of an apparatus for making composite fine powder according to the first preferred embodiment of the apparatus according to the present invention, which is used for practicing the first preferred embodiment of the method according to the present invention for producing the first preferred embodiment of the product according to the present invention, which is a composite fine powder. In this figure, the reference numeral 1 denotes a furnace shell which is substantially formed as a closed container, and a melting pot or crucible 2 is provided within this furnace shell 1. The upper part of this melting pot 2 is formed as a gas preheating chamber 4, which is of a convoluted form for the sake of good heat transfer, to the upper part of which a gas introduction port 3 is communicated; a pipe leads from this gas introduction port 3 to the outside. The lower part of the melting pot 2 is formed as a reaction chamber 5, and an opening 4a leads from the gas preheating chamber 4 to the reaction chamber 5 to allow gas to flow therebetween. A heater 6 is disposed generally around the melting pot 2, so as to heat up the melting pot 2 and the preheating chamber 4 and the reaction chamber 5 defined therein.

The bottom 8 of the reaction chamber 5 has a conduit 10 set thereinto, and this conduit 10 leads downwards to communicate the reaction chamber 5 with a condensation chamber 9 defined within the furnace shell 1 below the melting pot 2. Particularly according to an important principle of the present invention, the lower end of this conduit 10 is formed as a convergent-divergent nozzle 11 of the above described sort. Within the condensation chamber 9, below and opposed to the lower end of the convergent-divergent nozzle 11, there are provided a plurality of deceleration plates 13. The lower end of the condensation chamber 9 is communicated, via a conduit 14, with a powder collection chamber 15, to a middle portion of which said conduit 14 is communicated.

The upper part of the powder collection chamber 15 is communicated, via a conduit 16 and a control valve 17, to a vacuum pump 18; and the lower part of the powder collection chamber 15 is formed as a powder reservoir 20, which is communicated, via a downwardly extending conduit 20a within which are set two valves 21 and 22, to the outside.

THE OPERATION OF THE FIRST APPARATUS EMBODIMENT

The shown apparatus according to the first preferred embodiment of the present invention is generally used as follows. First, metal for forming powder as will be understood in detail later is charged into the reaction chamber 5 of the melting pot 2, and then the heater 6 is operated so as to heat up the melting pot 2 and the powder forming metal charged therein to a predetermined temperature $T_1$, so as to melt this powder forming metal into a pool of molten powder metal 7, and so as further to boil said pool of molten powder metal 7. Gas is then flowingly introduced through the gas introduction port 3 into the gas preheating chamber 4, the flow rate of this gas introduction being determined as will be understood later according to the control of the valve 17 which controls the removal of this gas from the other end of the apparatus by the action of the vacuum pump 18 which is being operated. This gas is heated up within the gas preheating chamber 4, and then passes in the heated state through the opening 4a from the gas preheating chamber 4 into the reaction chamber 5, wherein it mixes with the vapor of the boiling powder metal pool 7 which is being emitted from the free surface thereof.

This mixture gas is then ejected from the reaction chamber 5, according to the difference of pressures between the interior of the reaction chamber 5 which is at a predetermined pressure $P_1$ and the interior of the condensation chamber 9 which is at a predetermined pressure $P_2$ substantially lower than the pressure $P_1$, through the conduit 10 and through the convergent-divergent nozzle 11 at the lower end of said conduit 10 into the condensation chamber 9, and sprays out of the convergent-divergent nozzle 11 as a jet 12 which impinges against the deceleration plates 13. As this mixture gas passes through the convergent-divergent nozzle 11, as explained previously it reaches a supersonic speed and expands adiabatically very quickly, while the metal vapor and the introduced gas react together chemically while at the same time the metal vapor is being condensed into fine metal particles, and is cooled down by this adiabatic expansion to a second temperature $T_2$, and the product of this reaction forms a fine powder by condensation caused by this cooling, said powder being composed of very small particles which have cores formed of condensed metal vapor of the powder metal 7 charged in the reaction chamber 5 of the melting pot 2 and which have coatings around these cores of a ceramic chemical compound of said powder metal and of the gas injected through the gas introduction port 3.

The fine powder jet 12 produced, after impinging on the deceleration plates 13, and being slowed down thereby from its aforesaid high speed, settles down to the bottom of the condensation chamber 9 and flows through the conduit 14 to collect as a powder heap 19 in the lower portion of the powder collecting chamber 20, this flow being aided by the excess gas, since more gas flow is provided via the gas introduction port 3 into the apparatus than can be combined with the flow of metal vapor which is boiling off the free surface of the pool 7 of boiling metal in the reaction chamber 5. This excess gas then passes out of the top of the powder collecting chamber 15 through the conduit 16 under the control of the valve 17, being sucked out of the apparatus by the operation of the vacuum pump 18. The sucking rate of the pump 18 and the opening amount of the valve 17 and the injection flow rate of the gas through the gas introduction port 3 are all controlled so as to maintain the pressures in the reaction chamber 5 and in the condensation chamber 9 at substantially their respective predetermined desired values $P_1$ and $P_2$.

From time to time, some of the accumulated powder heap 19 in the bottom portion of the powder receiving chamber 15 is removed via the conduit 20a, by alternate operation of the valves 21 and 22 in a per se obvious fashion, without disturbing the depressurized state of the apparatus.

DESCRIPTION OF THE FIRST METHOD AND PRODUCT EMBODIMENTS

The first preferred apparatus embodiment of the present invention described above was operated so as to make a composite fine powder material consisting of a mass of fine powder particles formed with cores of metallic magnesium covered by surface layers of magnesium oxide, by charging metallic magnesium in the reaction chamber 5 of the melting pot 2, by operating the heater 6, and by injecting carbon monoxide gas (CO) through the gas introduction port 3 into the gas preheating chamber 4. The temperature $T_1$ to which the melting pot 2 and the molten magnesium metal pool 7 in the reaction chamber 5 thereof were heated was 900° C., and the rate of flowing in of the carbon monoxide gas and the opening of the valve 17 and the suction of the vacuum pump 18 were controlled so as to keep the pressure $P_1$ within the reaction chamber 5 at approximately 30 torr (with the partial pressure of magnesium vapor $P_{Mg}$ in said reaction chamber 5 at about 14 to 17 torr) and so as to keep the pressure $P_2$ within the condensation chamber 9 at approximately 1 to 3 torr.

As explained above, the vaporized magnesium produced by the boiling of the molten magnesium pool 7 mixed within the reaction chamber 5 with the heated carbon monoxide gas flowing thereinto through the aperture 4a, and this mixture of magnesium vapor and carbon monoxide gas, while the magnesium vapor was condensing and while also the magnesium and carbon monoxide were reacting chemically, then flowed out through the conduit 10 and through the convergent-divergent nozzle 11 into the condensation chamber 9, attaining a supersonic speed as it passed through the convergent-divergent nozzle 11. A jet flow including a fine powder body of particles condensed out of this reacting mixture gas, these particles having metallic magnesium cores and magnesium oxide coatings around the cores, and this jet flow impinged against the deceleration plates 13, the composite fine powder particles later being carried out of the condensation chamber 9 by the flow of excess carbon monoxide gas so as to be accumulated within the powder receiving chamber 15 and so as to be removed therefrom from time to time as explained above, while the excess carbon monoxide gas was removed by the vacuum pump 18 to be recycled. The temperature $T_2$ to which the mixture gas was cooled by the adiabatic expansion within the convergent-divergent nozzle 11 as it emerged into the condensation chamber 9 was about 250° C. or less.

In FIG. 2, there is shown a transmission electron microscope photograph of the resulting composite fine powder, which is the first preferred embodiment of the product according to the present invention, at an enlargement of 200,000×. With regard to these fine powder particles, the average particle diameter was 0.03 microns, the average thickness of the surface layer of magnesium oxide was 40 to 60 angstroms, and the average value of the ratio of the thickness of the surface layer of magnesium oxide to the particle diameter was 0.13 to 0.2. Since the fine powder particles were extremely small, it was of course impossible actually to measure their surface hardness and their toughness, but since as can be seen from the photomicrograph of FIG. 2 these fine powder particles were composed from cores of magnesium metal surrounded by surface layers of magnesium oxide ceramic, it is presumed that the surface of the particles had good hardness and heat resistance as would be appropriate for magnesium oxide, while the body as a whole of the fine powder particles had good toughness, better than that of a comparable fine powder body consisting solely of magnesium oxide.

When a composite material was produced using this composite fine powder as reinforcement material and metallic magnesium as matrix metal, with the volume ratio of the reinforcement material from 3 to 5%, and when the ambient temperature hardness and melting point were measured, it was found that they were improved by factors of approximately 3 to 4 and 1.2 or more respectively, as compared with a material consisting solely of magnesium. When a wear test based upon the LFW method, using a load of 15 kg, a test time of 30 minutes, and using oil for lubrication, was performed on the composite material, it was found that this composite material was superior in wear resistance to a comparison composite material in which pure ceramic powder was used as the reinforcement material, and also was improved with respect to peel off and drop out of the reinforcing powder particles.

THE CONSTRUCTION OF THE SECOND APPARATUS EMBODIMENT

Figure 3:
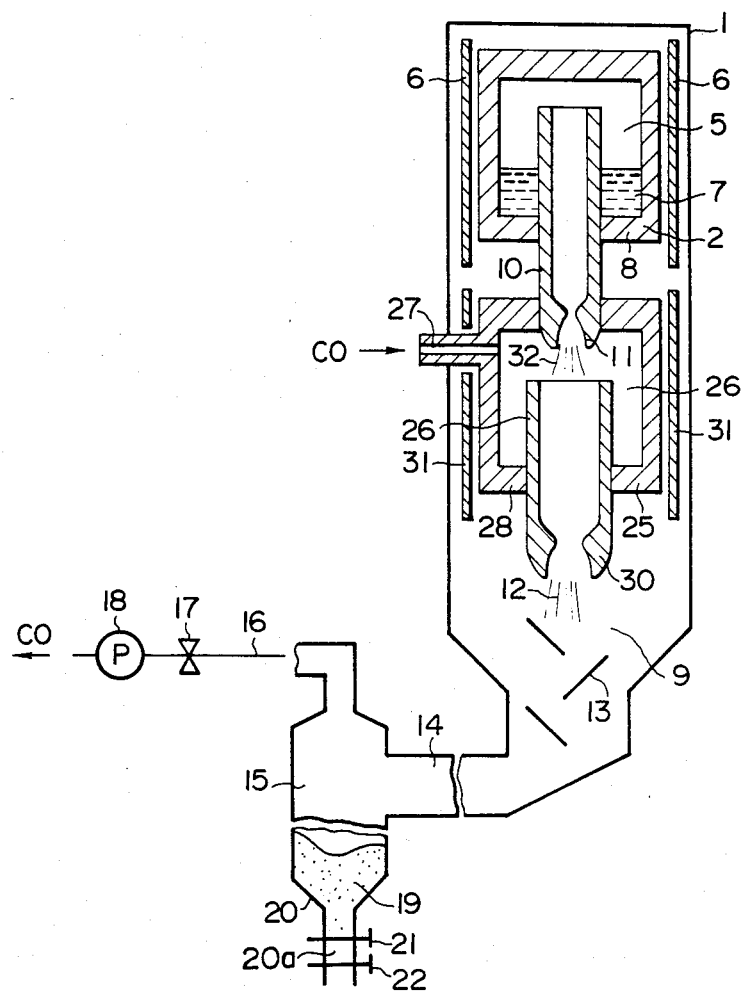
FIG. 3 is a schematic structural diagram, similar to FIG. 1, showing the second preferred embodiment of the apparatus according to the present invention for making a composite powder according to the present invention whose particles have metallic cores and ceramic outer layers, which practices the first preferred embodiment of the method according to the present invention.

In FIG. 3 there is shown a schematic view of an apparatus for making composite fine powder according to the second preferred embodiment of the apparatus aspect of the present invention, which is used for practicing the second preferred embodiment of the method according to the present invention for producing the second preferred embodiment of the product according to the present invention, which is also a composite fine powder. In FIG. 3, parts which correspond to parts of the first preferred apparatus embodiment shown in FIG. 1, and which have the same functions, are designated by the same reference numerals.

In this second apparatus embodiment, which will be described in detail because it is substantially different in structure from the first apparatus embodiment shown in FIG. 1, the reference numeral 1 again denotes a furnace shell which is substantially formed as a closed container, and a first melting pot or crucible 2 and a second melting pot or crucible 25 are provided within this furnace shell 1, with the first melting pot 2 above the second melting pot 25. The first melting pot 2 is formed with a first reaction chamber 5 in its interior space, and the second melting pot 25 is formed with a second reaction chamber 26 in its interior space. A first heater 6 is disposed generally around the first melting pot 2, so as to heat up the first melting pot 2 and the first reaction chamber 5 defined therein, and a second heater 31 is disposed generally around the second melting pot 25, so as to heat up the second melting pot 25 and the second reaction chamber 26 defined therein.

The bottom 8 of the first reaction chamber 5 has a first conduit 10 set thereinto, and this first conduit 10 leads downwards to communicate the first reaction chamber 5 with the second reaction chamber 26 defined within the second melting pot 25. Particularly according to an important principle of the present invention, the lower end of this first conduit 10 is formed as a first convergent-divergent nozzle 11 of the above described sort. Into the second reaction chamber 26 there opens a gas introduction port 27. The bottom 28 of the second reaction chamber 26 has a second conduit 29 set thereinto, and this second conduit 29 leads downwards to communicate the second reaction chamber 26 with a condensation chamber 9 defined within the furnace shell 1 below the second melting pot 25. Again, particularly according to the principle of the present invention, the lower end of this second conduit 29 is formed as a second convergent-divergent nozzle 30, again of the above described sort. Within the condensation chamber 9, below and opposed to the lower end of the second convergent-divergent nozzle 30, there are provided a plurality of deceleration plates 13. The lower end of the condensation chamber 9 is again communicated, via a conduit 14, with a powder collection chamber 15, to a middle portion of which said conduit 14 is communicated.

The upper part of the powder collection chamber 15 is again communicated, via a conduit 16 and a control valve 17, to a vacuum pump 18; and the lower part of the powder collection chamber 15 is formed as a powder reservoir 20, which is communicated, via a downwardly extending conduit 20a within which are set two valves 21 and 22, to the outside. Although it is not so shown, the gas sucked out by the vacuum pump 18 is again as a matter of practice recycled to be resupplied into the gas introduction port 3, for reasons of economical operation.

Although the second preferred embodiment of the apparatus according to the present invention shown in FIG. 3 only has the end of the first convergent-divergent nozzle 11 opposing the inlet of the second conduit 29 at a certain distance away therefrom, as a variation it would be possible for the tip end portion of the first convergent-divergent nozzle 11 to actually project into the upper end portion of the second conduit 29. In such a case, the jet flow 32 flowing at high speed out of the first convergent-divergent nozzle 11 directly into the upstream end of the second conduit 29 would suck in a flow of the gas within the second reaction chamber 26, thereby ensuring good mixing action therefor.

THE OPERATION OF THE SECOND APPARATUS EMBODIMENT

The second preferred embodiment of the apparatus according to the present invention described above is generally used as follows. First, metal for forming powder as will be understood in detail later is charged into the first reaction chamber 5 of the first melting pot 2, and then the first heater 6 is operated so as to heat up the first melting pot 2 and the powder forming metal charged therein to a predetermined temperature $T_1$, so as to melt this powder forming metal into a pool of molten metal 7, and so as further to boil said molten metal 7; and further the second heater 31 is operated so as to heat up the interior of the second melting pot 25 to a predetermined temperature $T_2$. Gas is then flowingly introduced through the gas introduction port 27 into the second reaction chamber 26, the flow rate of this gas introduction being determined as will be understood later according to the control of the valve 17 which controls the removal of this gas from the other end of the apparatus by the action of the vacuum pump 18 which is being operated. Meanwhile, vapor produced by the boiling of the powder metal pool 7 within the first reaction chamber 5 is ejected from the first reaction chamber 5, according to the difference of pressures between the interior of the first reaction chamber 5 which is at a predetermined pressure $P_1$ and the interior of the second reaction chamber 26 which is at a predetermined pressure $P_2$ substantially lower than the pressure $P_1$, through the conduit 10 and through the first convergent-divergent nozzle 11 at the lower end of said first conduit 10 into the second reaction chamber 26, and sprays out of the first convergent-divergent nozzle 11 as a jet 32 into the second reaction chamber 26. As this metal vapor passes through the first convergent-divergent nozzle 11, as explained previously it reaches a supersonic speed and expands adiabatically very quickly, and thus this metal vapor is at least partially condensed into fine metal particles, and is cooled down by this adiabatic expansion to a fairly low temperature, forming a fine powder by condensation caused by this cooling, said powder being composed of very small particles formed of condensed metal vapor of the powder metal 7 charged in the first reaction chamber 5 of the first melting pot 2.

Now, within this second reaction chamber 26, this jet 32 of metal particles and possibly also of residual metallic vapor is quickly reheated again, since the second reaction chamber 26 is being kept at a high temperature $T_2$; and at the same time the gas which is being injected through the gas introduction port 27 is mixed thereinto. By this reheating, a portion of the outer parts of the fine metallic particles may in fact be again vaporized, as the mixture gas is entrained so as to enter the upstream end of the second conduit 29. In any case, the mixture gas is ejected from the second reaction chamber 26, according to the difference of pressures between the interior of the second reaction chamber 26 which is at a predetermined pressure $P_2$ and the interior of the condensation chamber 9 defined within the furnace shell 1 below the second melting pot 25 which is at a predetermined pressure substantially lower than the pressure $P_2$, through the second conduit 29 and through the second convergent-divergent nozzle 30 at the lower end of said second conduit 29 into the condensation chamber 9, and sprays out of the second convergent-divergent nozzle 30 as a jet 12 into the condensation chamber 9, said jet impinging against the deceleration plates 13. As this mixture gas passes through the second convergent-divergent nozzle 30, in a similar fashion to that explained previously it reaches a supersonic speed and expands adiabatically very quickly, while the metal vapor and the introduced gas react together chemically while at the same time the metal vapor is again further being condensed into fine metal particles, and is cooled down by this adiabatic expansion to a low temperature, and the product of this reaction forms a fine powder by condensation caused by this cooling, said powder being composed of very small particles which have cores formed of condensed metal vapor of the powder metal 7 charged in the first reaction chamber 5 of the first melting pot 2 and which have coatings around these cores of a ceramic chemical compound of said powder metal and of the gas injected through the gas introduction port 27.

The jet of fine powder produced, after impinging on the deceleration plates 13 and being slowed down thereby from its aforesaid high speed, settles down to the bottom of the condensation chamber 13 and flows through the conduit 14 to collect as a powder heap 19 in the lower portion of the powder collecting chamber 15, this flow being aided by the excess gas, since more gas flow is provided via the gas introduction port 27 into the apparatus than can be combined with the flow of metal vapor which is boiling off the free surface of the pool 7 of boiling metal in the first reaction chamber 5. This excess gas then passes out of the top of the powder collecting chamber 15 through the conduit 16 under the control of the valve 17, being sucked out of the apparatus by the operation of the vacuum pump 18. The sucking rate of the pump 18 and the opening amount of the valve 17 and the injection flow rate of the gas through the gas introduction port 27 are again all controlled so as to maintain the pressures in the first reaction chamber 5 and in the second reaction chamber 26 at substantially their respective predetermined desired values $P_1$ and $P_2$.

From time to time, some of the accumulated powder heap 19 in the bottom portion of the powder receiving chamber 15 is removed via the conduit 20a, by alternate operation of the valves 21 and 22 in a per se obvious fashion, without disturbing the depressurized state of the apparatus.

DESCRIPTION OF THE SECOND METHOD AND PRODUCT EMBODIMENTS

The second apparatus embodiment described above was operated so as to make a mass of composite fine powder particles which had cores of metallic silicon covered by surface layers of silicon carbide, by charging metallic silicon in the first reaction chamber 5 of the first melting pot 2, by operating the first heater 6 and the second heater 31, and by injecting carbon monoxide gas (CO) through the gas introduction port 27 in to the second reaction chamber 26. The temperature $T_1$ to which the first melting pot 2 and the molten silicon powder metal pool 7 in the first reaction chamber 5 thereof were heated was 2500° C., the temperature $T_2$ to which the second reaction chamber 26 thereof was heated was 2000° to 2200° C., and the rate of flowing in of the carbon monoxide gas and the opening of the valve 17 and the suction of the vacuum pump 18 were controlled so as to keep the pressure $P_1$ within the first reaction chamber 5 at approximately 10 to 15 torr and so as to keep the pressure $P_2$ within the second reaction chamber 26 at approximately 3 to 4 torr.

As explained above, the vaporized silicon produced by the boiling of the molten silicon pool 7 in the first reaction chamber 5 flowed out through the first conduit 10 and through the first convergent-divergent nozzle 11 into the second reaction chamber 26, attaining a supersonic speed as it passed through the first convergent-divergent nozzle 11. A jet flow 32 including a fine powder body of metallic silicon particles condensed out of this metal vapor, as it was cooled down by this adiabatic expansion to a fairly low temperature, forming a fine metallic silicon powder by condensation caused by this cooling. Within this second reaction chamber 26, this jet 32 of metallic silicon particles and also of residual silicon vapor was quickly reheated again, since the second reaction chamber 26 was being kept at the high temperature $T_2$ of 2000° to 2200° C.; and at the same time the carbon monoxide gas which was being injected through the gas introduction port 27 was mixed thereinto. By this reheating, a portion of the outer parts of the fine metallic silicon particles started to be again vaporized, as the mixture gas was entrained so as to enter the upstream end of the second conduit 29. This mixture gas was ejected from the second reaction chamber 26, according to the difference of pressures between the interior of the second reaction chamber 26 which was being kept at the predetermined pressure $P_2$ and the interior of the condensation chamber 9 defined within the furnace shell 1 below the second melting pot 25 which was at a predetermined pressure substantially lower than the pressure $P_2$, through the second conduit 29 and through the second convergent-divergent nozzle 30 at the lower end of said second conduit 29 into the condensation chamber 9, while the silicon vapor was condensing and while also the silicon and carbon monoxide were reacting chemically, and sprayed out of the second convergent-divergent nozzle 30 as a jet 12. This jet 12 was composed of carbon monoxide gas and silicon vapor and of a spray of powder particles having metallic silicon cores and silicon carbide coatings around the cores, and this jet flow impinged on the decelerating plates 13. As before, the powder produced settled down to the bottom of the condensation chamber 13 and flowed through the conduit 14 to collect as a powder heap 19 in the lower portion of the powder collecting chamber 15, this flow being aided by the excess gas, since more gas flow was provided via the second gas introduction port 27 into the apparatus than could be combined with the flow of metal vapor which was boiling off the free surface of the pool 7 of boiling silicon metal in the first reaction chamber 5. Later, when sufficient of this fine composite powder had accumulated in the powder collecting chamber 20 as a heap of powder 19, it was removed from the apparatus as explained above.

No particular photomicrograph of the resultant composite material is shown in this specification, but in fact the average particle diameter was 0.7 microns, the average thickness of the surface layer of silicon carbide was 0.10 microns, and the average value of the ratio of the thickness of the surface layer of silicon carbide to the particle diameter was about 0.14. As before, it was of course impossible to measure the surface hardness and the toughness of the ceramic (silicon carbide) coating on the fine powder particles, but it is presumed that they were good, as would be appropriate for the constitution of the particles.

When a composite material was produced using this composite fine powder as reinforcement material and magnesium alloy (JIS standard MC2F) as matrix metal, with the volume ratio of the reinforcement material from 5 to 8%, and when the ambient temperature hardness, tensile strength, and other properties were measured, it was found that the ambient temperature hardness and the tensile strength were improved by factors of approximately 1.3 to 1.4 and 1.3 respectively, as compared with a material consisting solely of magnesium alloy. When a wear test based upon the LFW method, using a load of 15 kg, a test time of 30 minutes, and using oil for lubrication, was performed on the composite material, it was found that this composite material was superior in wear resistance to a comparison composite material in which pure ceramic powder was used as the reinforcement material, and also was improved with respect to peel off and drop out of the reinforcing powder particles.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular preferred embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A ceramic-metallic composite fine powder material comprising: fine powder particles each having a metallic core and a ceramic surface layer which is a compound of the metal composing said core and another element, wherein the average value of the ratio of the thickness of the surface layer of a powder particle to the radius of the particle is substantially greater than 0.05, wherein said powder material is made by:
   (a) mixing said metal in a gaseous form with said another element in the gaseous state, and
   (b) passing the resulting mixture through a convergent-divergent nozzle, thereby rapidly cooling the mixture by adiabatic expansion.

2. The material of claim 1 or, wherein the average value of the ratio of the thickness of the surface layer of a powder particle to the radius of the particle is substantially greater than 0.1.

3. The material of claim 1, wherein the average diameter of the particles is substantially less than 5 microns.

4. The material of claim 1, wherein the average diameter of the particles is substantially less than 1 micron.

5. A ceramic metallic composite powder material comprising: fine powder particles each having a metallic core and a ceramic surface layer, wherein the average value of the ratio of the thickness of the surface layer of a powder particle to the radius of the particle is substantially greater than 0.05, wherein
   (a) the cores of the particles are made of magnesium, and
   (b) the ceramic outer layers of the particles are made of magnesium oxide.

6. The material of claim 5, wherein the average diameter of the particle is substantially less than 5 microns.

7. The material of claim 5, wherein the average diameter of the particles is substantially less than 1 micron.

8. A ceramic metallic composite fine powder material comprising: fine powder particles each having a metallic core and a ceramic surface layer, wherein the average value of the ratio of the thickness of the surface layer of a powder particle to the radius of the particle is substantially greater than 0.05, wherein
   (a) the cores of the particles are made of silicon, and
   (b) the ceramic outer layers of the particles are made of silicon carbide.

9. The material of claim 8, wherein the average diameter of the particles is substantially less than 5 microns.

10. The material of claim 8, wherein the average diameter of the particles is substantially less than 1 micron.

* * * * *